(No Model.)

J. F. CASE.
APPARATUS FOR RAISING DOUGH.

No. 412,466. Patented Oct. 8, 1889.

WITNESSES:
John A. Rennie
J. A. C. Criswell

INVENTOR:
John F. Case,
By his Attorneys,
Arthur C. Fraser & Co

UNITED STATES PATENT OFFICE.

JOHN F. CASE, OF BROOKLYN, NEW YORK.

APPARATUS FOR RAISING DOUGH.

SPECIFICATION forming part of Letters Patent No. 412,466, dated October 8, 1889.

Application filed February 15, 1889. Serial No. 299,977. (No model.)

*To all whom it may concern:*

Be it known that I, JOHN F. CASE, a citizen of the United States, residing in the city of Brooklyn, in the county of Kings and State of New York, have invented certain new and useful Improvements in Apparatus for Raising Bread, of which the following is a specification.

This invention relates to that class of apparatus for raising bread, cake, and similar substances wherein the dough is placed in a closed chamber and subjected to a moderate heating during the process of fermentation.

The invention consists in special features in the construction of such apparatus, and is illustrated in the accompanying drawings, in which—

Figure 1:
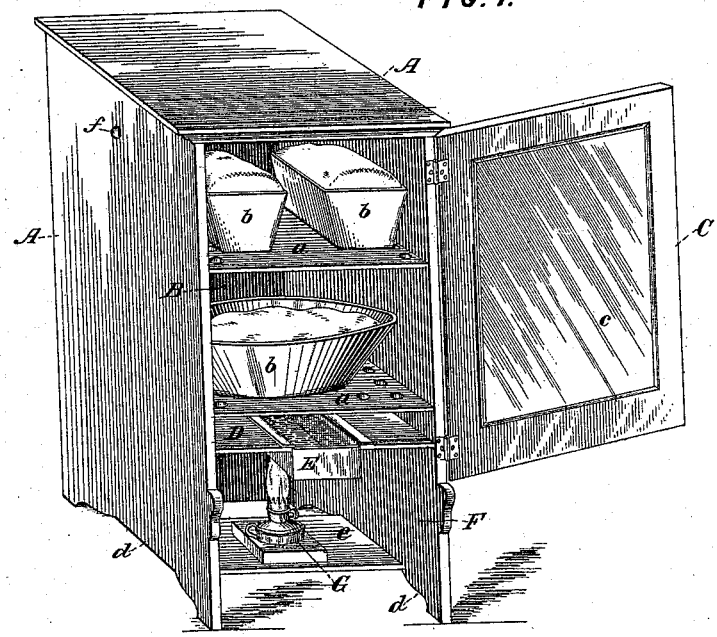
Figure 2:
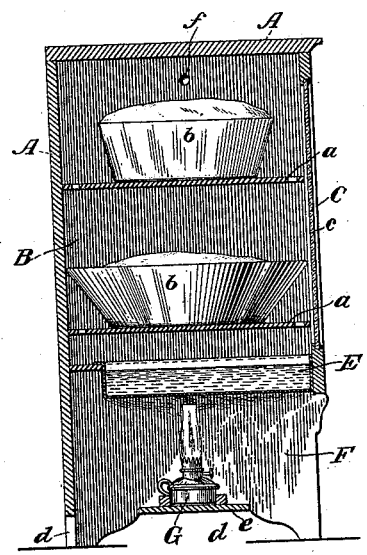

Figure 1 is a perspective view of my bread-raising apparatus, showing the door of the dough-chamber open and the dough-chamber filled with dough in the process of fermentation. Fig. 2 is a vertical longitudinal mid-section thereof, showing the door of the dough-chamber closed.

Referring to the drawings, let A represent the casing of a bread-raising apparatus, B the dough-chamber, and C the door of the dough-chamber.

D is the bottom wall of the dough-chamber, into which wall is set a water-vessel E, so that the two constitute a closed partition in the casing A, thereby dividing it into two compartments or chambers. The space within the casing A and below the wall D constitutes the heating-chamber F. Within the heating-chamber F is a lamp G, which is directly beneath and serves to heat the water-vessel E.

The dough-chamber B receives the pans of dough during the process of fermentation. This chamber is provided with one or more shelves *a a*, on which shelves the dough-pans *b b* are placed. The shelves are perforated to permit the warm vapors arising from the water-vessel E to reach the upper part of the dough-chamber and come in contact with the dough.

The door C is hinged to the casing A and adapted to close so tightly against the dough-chamber B that there will be practically no means for communication between the exterior air and the interior of the dough-chamber.

The door C is provided with a glass *c* to enable the attendant to observe the condition of the dough during the progress of the fermentation without the necessity of opening the door, and thereby altering the temperature within the dough-chamber. The bottom edge of the door C does not project below the bottom of the water-vessel E, so that the front of the casing A below the dough-chamber is open.

The water-vessel E is preferably oblong in shape, and it extends from the forward edge of the bottom wall D of the dough-chamber rearwardly a distance nearly equal to the extreme length of this wall. The water-vessel is of a depth sufficient to project somewhat below the under side of the bottom wall D, and is set into the bottom wall and secured therein, so that the joint between the two is a tight joint, in order to prevent communication between the heating-chamber F and the dough-chamber B.

The heating-chamber F is open on its front side, and has openings *d d* at the bottom of its side and rear walls, whereby a circulation of air is permitted, and the accumulation of products of combustion in the chamber is prevented. A shelf *e* is arranged in the lower part of this chamber, immediately beneath the water-vessel, and on this shelf rests a lamp G, which latter is placed under the center of the water-vessel E.

One or more small perforations *f* are preferably made in the casing A at the top of the dough-chamber B, in order to allow the escape of air therefrom in the event of a pressure within the dough-chamber exceeding the ordinary atmospheric pressure.

In using my invention for raising bread according to this method the dough is placed in one of the pans *b b*, preferably the larger one, when it is ready for the first fermentation, and the pan is placed in the dough-chamber B. Water, preferably slightly warm, is then poured into the water-vessel E until the latter is about two-thirds full, and the door C is closed. The lamp G is thereupon lighted and placed under the water-vessel E, which it heats. The temperature within the chamber B can be regulated by adjusting the lamp in the usual manner. As the lamp heats the water in water-vessel E, moist heat-conveying vapors arise therefrom and fill the chamber B, surrounding the dough-pan b and the top surface of the dough. The warmth accelerates the fermentation, and the vapor preserves the soft character of the exposed surface of the dough and prevents the formation of a hard or dry crust thereon. As the temperature within the dough-chamber is invariable, and as the chamber is closed from the outside air, there is no opportunity for the process of fermentation to be checked or otherwise interfered with by sudden changes of temperature or by drafts. Under these circumstances the fermentation progresses rapidly, and in a short time the "sponge" is sufficiently developed to be in condition for kneading. When this stage is reached, the sponge is taken out of the dough-chamber and kneaded to the desired extent. It is then divided and placed in the baking-pans, which are then replaced in the dough-chamber for the second raising. The bread-raiser is operated as before, and the moist heat-conveying vapors arising from the water in water-vessel E fill the chamber and come in contact with the dough. The warmth within the chamber accelerates the fermentation again, and the moisture preserves the softness and delicacy of the exposed upper surfaces of the dough and prevents the formation of a hard or thick crust thereon. In a short time, when the dough is found to have risen sufficiently for baking, it is removed from the bread-raiser and placed in a baking-oven to bake.

With my improved bread-raising apparatus I am able to complete the whole process of raising and baking bread within five hours, and to insure a perfect raising of bread, cake, or other similar substances within less time than is ordinarily consumed in accomplishing this, and in a period of time which is always uniform, and also to raise the bread in a perfectly sweet and light condition.

My invention overcomes the difficulties heretofore encountered in raising bread, in that it keeps the elements surrounding the dough in a uniform condition, irrespective of changes in weather, drafts, or the failure of the fire in the room within which the bread-raising apparatus is located.

For convenience in refilling the water-vessel E, and for cleaning it, I so place it in the bottom wall D of the dough-chamber that it can be slid out therefrom when desired. If it is merely necessary to refill the vessel, the door C will be opened, and the water-vessel E will be slid forward until it projects somewhat in front of the wall D. In this position it can readily be filled with water. When so filled it is pushed back into the wall D. If it becomes necessary to clean the water-vessel E, the latter is slid entirely out of the wall D, whereupon it can be thoroughly cleaned without inconvenience. After cleaning it is replaced in the wall D, and is filled with water, whereupon the apparatus is ready for operation.

My invention is susceptible of various modifications without departing from the essential features thereof. For example, a slide or cover may be used instead of a door; also, any suitable means may be substituted for the perforated shelves a a within the dough-chamber for supporting the dough-pans; also, the water-vessel E may be constructed of any desired shape, or it may extend entirely across the bottom of the dough-chamber, thereby constituting in itself the lower wall of the dough-chamber; or the perforations f at the top of the dough-chamber may be omitted; or the heating-chamber F may be modified as desired.

Although I prefer to use a lamp for heating the water in water-vessel E, any other suitable source of heat that will serve the purpose may be substituted therefor.

What I claim as my invention is, in an apparatus for raising bread and similar substances, the following defined novel features and combinations, substantially as hereinbefore set forth, namely:

1. A bread-raiser consisting of a dough-chamber having a water-vessel set into and forming part of the bottom wall thereof, a permanent shelf immediately beneath the water-vessel, and a lamp or other equivalent source of heat upon said shelf and beneath said vessel and adapted to apply heat directly thereto.

2. A bread-raiser consisting of a dough-chamber having a water-vessel set into and forming a part of the bottom wall thereof and so mounted therein that it is capable of being slid forward out of said wall for refilling or cleaning.

3. A bread-raiser consisting of a dough-chamber having a water-vessel set into and forming part of the bottom wall thereof and so mounted therein that it is capable of being slid forward out of said wall, and a door adapted to close against such water-vessel and retain the latter in position.

4. A bread-raiser consisting of a casing divided by a closed horizontal partition into an upper dough-chamber and a lower heating-chamber, said partition having a water-vessel set thereinto and constituting a portion thereof, a permanent shelf in the lower part of said heating-chamber immediately beneath said water-vessel, a lamp upon said shelf and immediately beneath said water-vessel, and a door covering one side of said dough-chamber and extending down to and covering the front of said partition, but arranged to leave the front of the heating-chamber open, so that the lamp therein is accessible and the products of combustion may escape therefrom while the dough-chamber is closed to the outer air.

5. A bread-raiser consisting of a casing open on one side and divided by a closed horizontal partition into an upper dough-chamber and a lower heating-chamber, said dough-chamber having a door covering its front side, a water-vessel set into the bottom of the dough-chamber and forming part of the closed horizontal partition and so mounted that it can be slid out of the dough-chamber and adapted to be held in place by the said door, said heating-compartment being open at its front side and having openings in the lower part of its closed sides, a shelf in the heating-chamber immediately beneath said water-vessel, and a lamp on said shelf arranged directly under said water-vessel and adapted to heat the latter.

6. A bread-raiser consisting of a casing open throughout its entire extent on one side, a horizontal closed partition dividing said casing into an upper dough-chamber and a lower heating-chamber, said dough-chamber having steam-outlet apertures in its upper part, shelves in said dough-chamber for supporting the dough-pans, a removable water-vessel set into the bottom of the dough-chamber and constituting a portion of the said closed horizontal partition and mounted therein so that it can be slid out of the dough-chamber, a shelf in the heating-chamber immediately beneath the water-vessel, a lamp on said shelf directly under said water-vessel, whereby the water in said vessel is heated, and a door on the open side of said casing, said door closing the dough-chamber entirely and terminating just below said closed partition, whereby said heating-chamber is left open on one side and said water-vessel is held in place.

In witness whereof I have hereunto signed my name in the presence of two subscribing witnesses.

JOHN F. CASE.

Witnesses:
GEORGE H. FRASER,
CHARLES K. FRASER.